(12) United States Patent
Chun et al.

(10) Patent No.: US 8,064,376 B2
(45) Date of Patent: Nov. 22, 2011

(54) METHOD OF TRANSMITTING AND RECEIVING CONTROL INFORMATION FOR POINT-TO-MULTIPOINT MULTIMEDIA MULTICAST SERVICE

(75) Inventors: Sung Duck Chun, Gyeonggi-do (KR); Young Dae Lee, Gyeonggi-do (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 11/909,253

(22) PCT Filed: Mar. 29, 2006

(86) PCT No.: PCT/KR2006/001141
§ 371 (c)(1),
(2), (4) Date: Oct. 2, 2009

(87) PCT Pub. No.: WO2006/104343
PCT Pub. Date: Oct. 5, 2006

(65) Prior Publication Data
US 2010/0014450 A1    Jan. 21, 2010

Related U.S. Application Data

(60) Provisional application No. 60/667,748, filed on Mar. 31, 2005.

(30) Foreign Application Priority Data

Mar. 29, 2005  (KR) ........................ 10-2005-0026029

(51) Int. Cl.
*H04H 20/71*   (2008.01)
*H04W 4/00*    (2009.01)
*H04B 7/00*    (2006.01)

(52) U.S. Cl. ......... 370/312; 370/329; 455/500; 455/515
(58) Field of Classification Search .................. 370/312, 370/329; 455/500, 515
See application file for complete search history.

(56) References Cited

U.S. PATENT DOCUMENTS

| | | | |
|---|---|---|---|
| 2005/0002397 A1* | 1/2005 | Poulsen et al. | 370/390 |
| 2005/0020260 A1* | 1/2005 | Jeong et al. | 455/434 |
| 2005/0091313 A1* | 4/2005 | Zhou et al. | 709/204 |
| 2005/0233732 A1* | 10/2005 | Kwak et al. | 455/414.1 |
| 2006/0198325 A1* | 9/2006 | Gao et al. | 370/270 |

FOREIGN PATENT DOCUMENTS

| | | |
|---|---|---|
| EP | 1492249 | 12/2004 |
| EP | 1501328 | 1/2005 |

(Continued)

OTHER PUBLICATIONS

LG Electronics, "Optimization of MBMS Services Information Message," R2-050844, TSG-RAN Working Group 2 #46bis, Apr. 2005.

*Primary Examiner* — Marsha D Banks Harold
*Assistant Examiner* — Saad Hassan
(74) *Attorney, Agent, or Firm* — Lee, Hong, Degerman, Kang & Waimey

(57) ABSTRACT

A method of receiving broadcast information from a network in a wireless communication system is disclosed. More specifically, a mobile terminal receives information of a specified number of groups and also receives a plurality of messages according to the information of the specified number of groups, wherein each message corresponds to each time interval. Furthermore, the mobile terminal acquires the broadcast information from the received plurality of messages.

10 Claims, 6 Drawing Sheets

FOREIGN PATENT DOCUMENTS

| | | |
|---|---|---|
| RU | 2149518 | 5/2000 |
| WO | 2004017541 | 2/2004 |
| WO | 2005018098 | 2/2005 |
| WO | 2006083140 | 8/2006 |

* cited by examiner

--Prior Art--

—-Prior Art—-

—Prior Art—

METHOD OF TRANSMITTING AND RECEIVING CONTROL INFORMATION FOR POINT-TO-MULTIPOINT MULTIMEDIA MULTICAST SERVICE

CROSS-REFERENCE TO RELATED APPLICATIONS

This application is a 371 U.S. national stage application of international application PCT/KR2006/001141, filed on Mar. 29, 2006, which claims priority to Korean patent application 10-2005-0026029, filed on Mar. 29, 2005 and U.S. provisional application 60/667,748, filed on Mar. 31, 2005, the contents of which are hereby incorporated by reference herein in their entirety.

TECHNICAL FIELD

The present invention relates to a method of transmitting and receiving broadcast information, and more particularly, to a method of transmitting and receiving broadcast information for point-to-multipoint service.

BACKGROUND ART

FIG. 1 illustrates a network structure of a Universal Mobile Telecommunication System (UMTS) according to a conventional art. More specifically, the UMTS comprises a User Equipment (UE), a UMTS Terrestrial Radio Access System (UTRAN), and a Core Network (CN). The UTRAN further comprises more than one Radio Network Sub-systems (RNS) and each RNS comprises a Radio Network Controller (RNC) and at least one base station (Node B) which is managed by the RNC. Moreover, each Node B comprises at least one cell. Hereafter, the UE can be alternatively referred to as a mobile terminal, a mobile station, a terminal, to name a few.

FIG. 2 illustrates a structure of a Radio Interface Protocol between the UE and the UTRAN based on a $3^{rd}$ Generation Partnership Project (3GPP) wireless access network standard. As illustrated in FIG. 2, the Radio Interface Protocol comprises, horizontally from bottom up, a physical layer, a data link layer, and network layer. In addition, the Radio Interface Protocol comprises, vertically from left to right, a control plane for transmitting control signals and a user plane for transmitting data. Furthermore, the protocol layers can be classified into Layer 1 (L1), Layer 2 (L2), and Layer (3) which is based on bottom three layers of an Open System Interconnection (OSI).

L1 or the physical layer uses a physical channel to provide Information Transfer Service to the upper layer. Structurally, the physical layer is connected to a Medium Access Control (MAC) layer via a transport channel through which data is transferred. At the same time, data transmission between the transmission end and the receiving end of the physical layer take places through the physical channel.

The MAC layer of L2 uses a logical channel to transfer information to higher layer or a Radio Link Control (RLC) layer. The RLC layer can support reliable data transmission and can perform segmentation and/or concatenation on a Service Data Unit (SDU) transferred from higher layer.

A Radio Resource Control (RRC) of L3 is operational only in the control plane. The RRC controls configuration, re-configuration, and release of a Radio Bearer (RB) in relation to the logical channel, transmission channel, and physical channel. Here, the RB represents service(s) provided from L2 between the UE and the UTRAN for data transmission. A configuration of the RB generally signifies specific characteristic of the protocol layer(s) and channel(s) necessary for providing a specified service and configuration of parameters and operational schemes.

A detailed description of a Multimedia Broadcast/Multicast Service (MBMS) will be explained. The MBMS uses a MBMS bearer service to provide streaming or background services to a plurality of UEs. The MBMS service comprises at least one session, and the MBMS data is transmitted only during the operation of the session through the bearer service.

FIG. 3 illustrates a structural diagram of a MBMS service from the perspective of the UE according to the conventional art. As illustrated in FIG. 3, the UTRAN uses the RB to provide the MBMS bearer service to the UE. Here, the RBs can be represented with two types, namely, a point-to-point RB and a point-to-multipoint RB. Here, the point-to-point RB is a bi-directional RB and is comprised of a logical channel (i.e., Dedicated Traffic Channel (DTCH)), a transmission channel (i.e., Dedicated Channel (DCH)), and a physical channel (i.e., Dedicated Physical Channel (DPCH) or Secondary Common Control Physical Channel (SCCPCH)). Moreover, the point-to-multipoint RB is a uni-directional downlink RB, and as illustrated in FIG. 3, is comprised of a logical channel (i.e., MBMS traffic Channel (MTCH)), a transmission channel (i.e., Forward Access Channel (FACH), and a physical channel (i.e., SCCPCH). More specifically, the logical channel MTCH is configured during each MBMS service provided to the cell and is used provide user plane data to a plurality of UEs.

Furthermore, a logical channel MBMS Control Channel (MCCH) is a point-to-multipoint downlink channel used to transmit MBMS related control information. The logical channel MCCH is mapped to a Forward Access Channel (FACH), and the FACH is mapped to the SCCPCH. In addition, one MCCH exists per each cell.

The conventional art related to the discussion above has following shortcomings. In the conventional art, in order for the UTRAN to transmit a large amount of information on the MCCH during a single modification period, the UTRAN increased a transmission rate of the MCCH or simple extended the transmission period. However, if the MCCH transmission rate is increased, Node B consumes more power, and at the same time, modification of the MCCH information can be delayed.

DISCLOSURE OF THE INVENTION

Accordingly, the present invention is directed to a method of transmitting and receiving control information for point-to-multipoint multimedia multicast service that substantially obviates one or more problems due to limitations and disadvantages of the related art.

An object of the present invention is to provide a method of receiving broadcast information from a network in a wireless communication system.

Another object of the present invention is to provide a method of transmitting broadcast information to a mobile terminal from a network in a wireless communication system.

A further object of the present invention is to provide a method of acquiring service information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method receiving broadcast information from a network in a wireless communication system includes a mobile terminal for receiving information of a specified number of groups and receiving a plurality of messages according to the information of the specified number of groups, wherein each message corresponds to each time interval. Furthermore, the mobile terminal is included in the system for acquiring the broadcast information from the received plurality of messages.

In another aspect of the present invention, a method of transmitting broadcast information to a mobile terminal from a network in a wireless communication system is disclosed. In the method, the network groups a plurality of information into a specified number of groups and allocates each of the specified groups to a time interval. Thereafter, the network transmits information of the specified number of groups to the mobile terminal and transmits a plurality of messages, wherein each message corresponds to each time interval.

Yet, in another aspect of the present invention, a method of receiving broadcast information from a network in a wireless communication system is described. More specifically, the network receives through a control channel a plurality of messages, wherein a first message includes information of a specified number of groups, and subsequent messages include a list of elements allocated to each group, Moreover, the network receives subsequent message, wherein each subsequent message corresponds to each time interval and acquires the broadcast information from the received subsequent messages.

In further aspect of the present invention, a method of acquiring service information is described. More specifically, a mobile terminal receives a plurality of message during at least one modification period and stores contents of the plurality of messages. Furthermore, the mobile terminal acquires a length of the modification period from the stored plurality of messages, wherein the length of the modification period is an integer greater than '0' and terminates reception of the plurality of messages when the length of the modification period equals '0.'

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
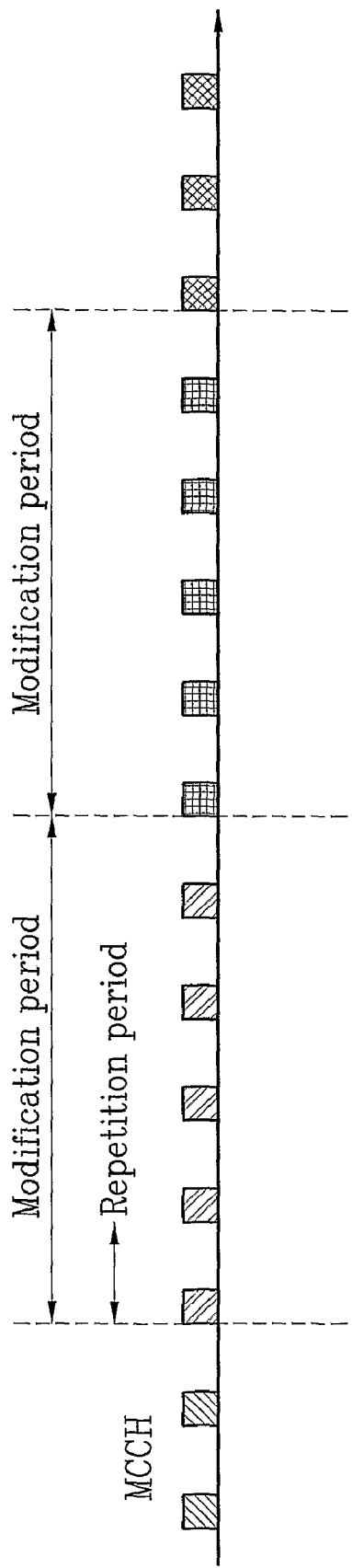
FIG. 4 illustrates an example of a MCCH information transmission scheme.

FIG. 4 illustrates an example of a MCCH information transmission scheme. The MCCH is an example of broadcast information. More specifically, the UTRAN, which provides the MBMS service, transmits MCCH information to a plurality of UEs via the MCCH. The MCCH information is transmitted periodically according to a modification period and a repetition period. Moreover, the MCCH information can be classified into critical information and non-critical information. Accordingly, the non-critical information can be freely modified for transmission during every modification period and repetition period. On the contrary, the critical information can only be modified during the modification period. In other words, the critical information is transmitted once per each repetition period, and the modified critical information can only be transmitted at start of the modification period.

In addition, the MCCH information refers to MBMS and related control message (e.g., related RRC message). The MCCH information includes a MBMS Modified Services Information (MSI), a MBMS Unmodified Services Information (USI), and a point-to-multipoint RB information, and access information. Among these MCCH information, the access information message can be categorized as non-critical information, while the other messages can be categorized as critical information.

When the UTRAN transmits all of messages included in the MCCH information, and if the message includes information related to a specified service, then a MBMS transmission identity is included in the message. In detail, the MBMS transmission identity comprises a MBMS session identity and a MBMS service identity. When the UTRAN transmits the MBMS MSI message, the message contains the MBMS transmission identity and information related to service(s) corresponding to the transmission identity.

Figure 1:
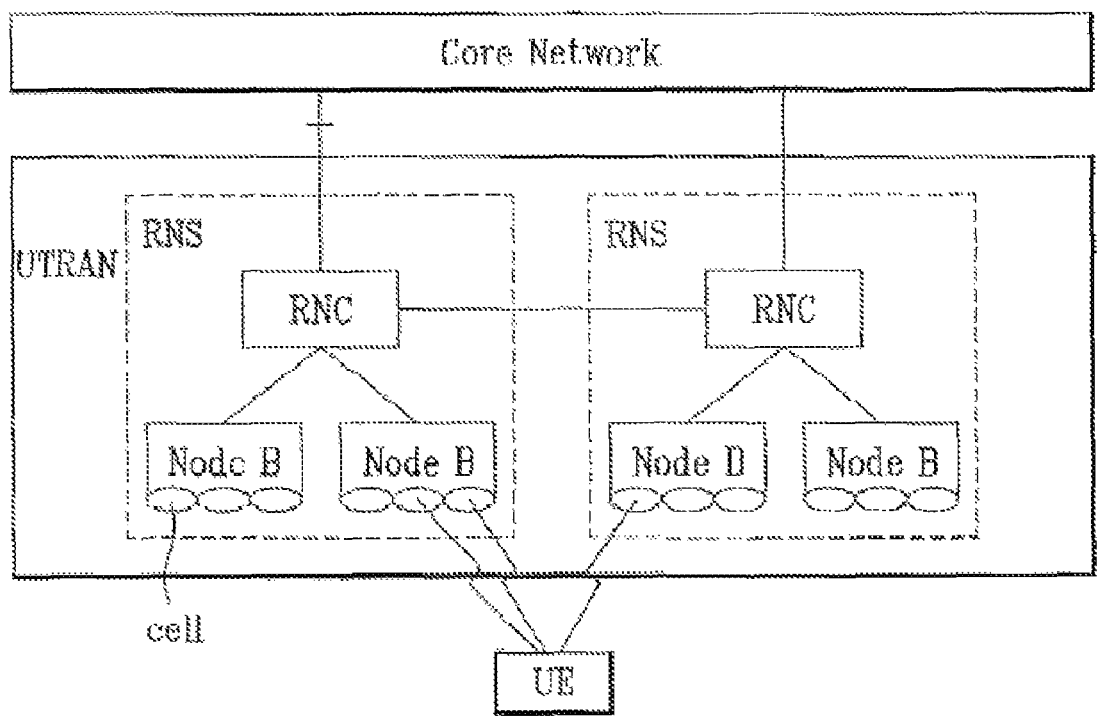
FIG. 1 illustrates a network structure of a Universal Mobile Telecommunication System (UMTS) according to a conventional art.
Figure 2:
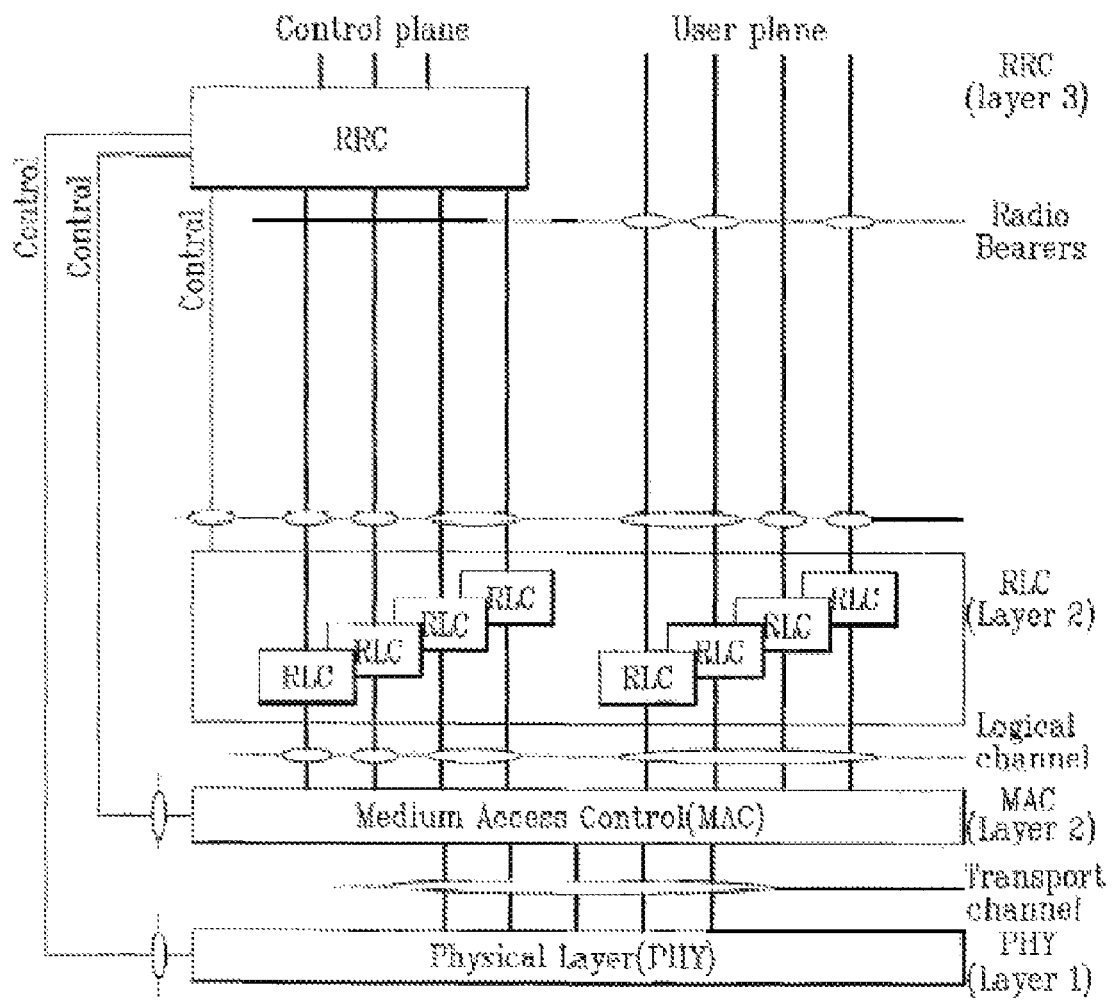
FIG. 2 illustrates a structure of a Radio Interface Protocol between a User Equipment and a UTRAN based on a $3^{rd}$ Generation Partnership Project (3GPP) wireless access network standard.
Figure 3:
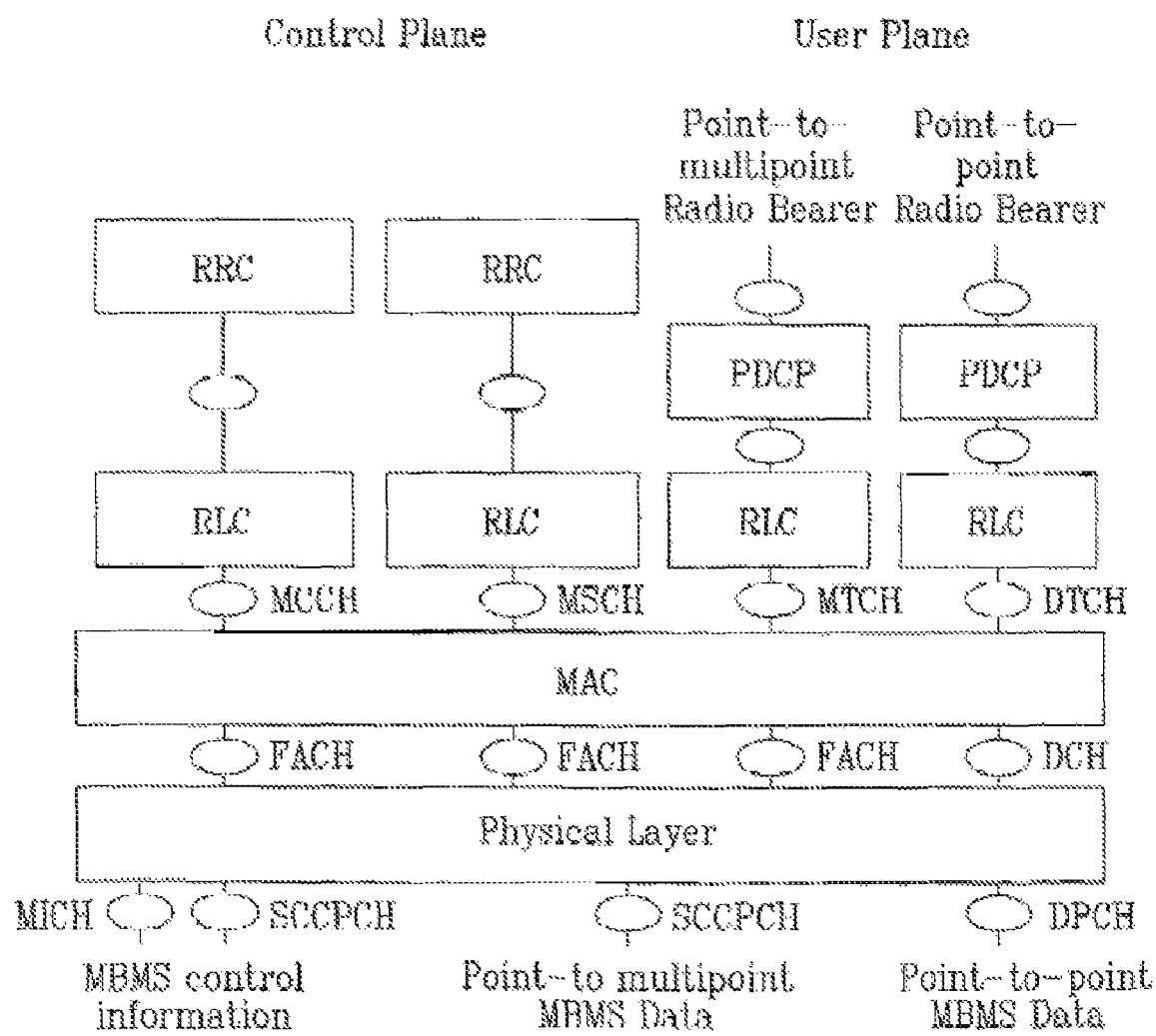
FIG. 3 illustrates a structural diagram of a MBMS service from the perspective of the UE according to the conventional art.

Furthermore, the UTRAN periodically transmits data via a MBMS Notification Indicator Channel (MICH), as illustrated in FIG. 3. Here, the data contains information pertaining to whether the MCCH information is updated during the modification period. If the UE wishes to receive only a certain MBMS service, then the UE does not receive data via the MCCH nor the MTCH prior to start of the service of that particular session but instead receives the data via the MICH periodically. In the description of the present application, updating the MCCH information refers to generating, adding, modifying, or removing a specific item from the MCCH information.

In order to notify whether the MCCH information is updated during the modified period, the UTRAN transmits data via the MICH and the MSI message. The MSI message includes the identity information of all the services of the current cell being modified during the corresponding modification period as well as operation-related information for the UEs subscribed to the corresponding service(s). As identify information, the MBMS transmission identity is used. Here, the MBMS transmission identity can be comprises of the MBMS service identity for instructing a specific service and/or the MBMS session identity for instructing a specific session of a particular service can be combined with the MBMS service identity.

In addition, the identity information of the services unmodified during the modification period can be transmitted via the USI message. Here, the MBMS transmission identity of the corresponding service is used as the identity information.

When the specific MBMS service session is activated, the UTRAN transmits a Notification Indicator (NI) via the MICH. The NI indicates to the UE wishing to receive the specific MBMS service to receive data from the MCCH. After receiving the NI via the MICH, the UE receives the data on the MCCH during the specified modification period as indicated in the NI. While receiving the data on the MCCH, the UE receives the MSI message to first determine whether the MBMS service it wishes to receive has been modified during the corresponding modification period. At this time, if the MBMS service has been modified, then the UE acquires the modified MCCH information. As for the UE, the UE receives the MSI message and the USI message transmitted during a modification period and can compile a list of all the services provided in the current cell during the corresponding modification period.

If the UE wishes to receive a certain MBMS service by using the point-to-multipoint RB, then the UE can receive the MCCH information, which includes the RB information, on the MCCH and use the received MCCH information to assign the point-to-multipoint RB to the UE. After the UE completes configuring the point-to-multipoint RB, the UE can continue to receive data on the SCCPCH, to which the MTCH is mapped, and acquire the data of the MBMS service transmitted on the MTCH.

The UTRAN can transmit data discontinuously on the MTCH. As illustrated in FIG. 3, the UTRAN can periodically transmit a scheduling message to the UE on a MBMS scheduling channel (MSCH) of the SCCPCH. Here, the scheduling message provides a transmission start point and a transmission period of the MBMS data which is transmitted during a scheduling period. To this end, the UTRAN should provide in advance a scheduling period of the scheduling information to the UE.

Table 1 shows a composition of the MSI and USI messages absent service modification according to an embodiment of the present invention.

In the embodiment of the present invention, the USI message can be modified during every USI Period (UP), and the MSI message can be modified during every MSI Period (MP). The length of the UP is S times the length of the MP. According to Table 1, the length of the UP is three (3) times in length than that of the MP. Here, S is three (3). In other words, one (1) UP includes three (3) MPs. In addition, the lengths of the UP and the MP can be represented in time intervals. These time intervals can be of same length or of different lengths.

As illustrated by Table 1, information of unmodified services are categorized and grouped into one of three MPs. Unlike the conventional art where the USI message transmits all information related to all of the unmodified services in a single MP, the USI message according to the embodiment of the present invention transmits a part (or a specified portion) of the information of the unmodified services. To accomplish this, all of the MBMS services currently in session in the corresponding cell is divided into S number of groups (e.g., G1, G2, G3), and each group is allocated to a different MP. Again, S number of MPs comprises a UP.

For example, the services can be grouped in a manner such that Services 1-5 belong to G1, Services 6-10 belong to G2, and Services 11-14 belong to G3. More specifically, referring to Table 1, Services 1-5 are allocated to MP#1 of UP#1, Services 6-10 are allocated to MP#2 of UP#1, and Services 11-14 are allocated to MP#3 of UP#1. If a certain service is allocated to a specific MP of a UP, then that particular allocation can be applied to subsequent UPs in a same manner. Moreover, such allocation is maintained until termination of the session of the corresponding service.

According to the embodiment of the present invention, the UTRAN transmits the MSI and USI messages including the service information of the corresponding cell to the UE. Before the MSI and USI messages can be received, the UE acquires information related to S number of groups. Thereafter, the UE receives a plurality of the messages consecutively according to S number of groups. Here, each of the MSI or the USI message corresponds to a time interval or put differently, the length of the period.

Table 1 illustrates a scenario where there is no modification or change in any of the MPs. That is, as illustrated in Table 2, there is no modification (e.g., the MSI message is empty) in MP#1 through MP#6. As such, the service information are included in the USI message and not in the MSI message since there is no modification to the service. Here, the services (e.g., Service 1, Service 8, Service 14) represent information that is transmitted in the MSI message and/or the USI message in a particular MP/UP.

Alternatively, Table 2 illustrates a scenario where service modifications are indicated in each MP except in MP#5.

TABLE 1

| | USI Period | | | | | |
| --- | --- | --- | --- | --- | --- | --- |
| | UP#1 | | | UP#2 | | |
| | Modification Period | | | | | |
| | MP#1 | MP#2 | MP#3 | MP#4 | MP#5 | MP#6 |
| MSI | — | — | — | — | — | — |
| USI | Service 1 | Service 6 | Service 11 | Service 1 | Service 6 | Service 11 |
| | Service 2 | Service 7 | Service 12 | Service 2 | Service 7 | Service 12 |
| | Service 3 | Service 8 | Service 13 | Service 3 | Service 8 | Service 13 |
| | Service 4 | Service 9 | Service 14 | Service 4 | Service 9 | Service 14 |
| | Service 5 | Service 10 | | Service 5 | Service 10 | |

TABLE 2

| | USI Period | | | | | |
|---|---|---|---|---|---|---|
| | UP#1 | | | | UP#2 | |
| | | | Modification Period | | | |
| | MP#1 | MP#2 | MP#3 | MP#4 | MP#5 | MP#6 |
| MSI | Service 2<br>Service 8 | Service 2<br>Service 3<br>Service 5 | Service 11<br>Service 14 | Service 10<br>Service 12 | — | Service 8<br>Service 12 |
| USI | Service 1<br>Service 3<br>Service 4<br>Service 5 | Service 6<br>Service 7<br>Service 8<br>Service 9<br>Service 10 | Service 12<br>Service 13 | Service 1<br>Service 2<br>Service 3<br>Service 4<br>Service 5 | Service 6<br>Service 7<br>Service 8<br>Service 9<br>Service 10 | Service 11<br>Service 13<br>Service 14 |

As is the case in the conventional art, if modification or change to the corresponding service information is indicated in a specific MP, the MSI message transmitted in the specific MP. That is, the MSI message includes service identity information of modified service information regardless which service group (e.g., G1, G2, G3) the service information is included. However, the USI message transmitted in the specific MP does not include the modified service information, but only the service information of the unmodified services allocated to that specific MP.

For example, referring to Table 2, modifications to service information are indicated by Service 2 and Service 8 of MP#1. In addition, modifications to service information are indicated by Services 2, 3, and 5 of MP#2, while further modifications to service information are indicated by Services 11 and 14 of MP#3. In MP#1, since Service 2 information is already allocated to MP#1, modified service information related to Service 2 is not included in the USI message of MP#1 but only in the MSI message of MP#1. Furthermore, since Service 8 information is allocated to MP#2, modified service information related to Service 8 is included in MSI message of MP#1, and the unmodified Service 8 information in included in the USI message of MP#2. Here, unless Service 8 information is modified again in the subsequent period (i.e., MP#2), Service 8 information is unmodified and included as allocated.

In MP#2, since modification to Service 2 information is indicated in MP#2, the modified Service 2 information is included in the MSI message of MP#2. Even though Service 2 information is allocated to MP#1, Service 2 information is not included the USI message of MP#1 because Service 2 information is modified in MP#1. The modified service information is included in the MSI message of the corresponding MP.

In MP#3, since Service 11 and 14 information are already allocated in MP#3, their modified service information are included in the MSI message, and the remaining Services 12 and 13 information are included in the USI message since they are not modified.

With respect to UP#2, modifications to Services 10 information and Service 12 information are indicated in MP#4, and modifications to Service 8 information and Service 12 information are further indicated in MP#6. As such, these modified service information are included in the MSI message of the corresponding MPs. Here, since the modified Service 10 information is indicated in MP#4, the modified service information is included in the MSI message of MP#4, and at the same time, the modified Service 10 information is included in the USI message of MP#5 as already allocated. In addition, since modified Service 12 information is included in MP#4 and MP#6, this service is included in the MSI of the corresponding MPs. Moreover, because the modified Service 12 information is included in the MSI message of MP#6, it is not included in the USI message of MP#6. Lastly, modified Service 8 information is indicated in MP#6, and as such, the modified Service 8 information is included in the MSI message of MP#6 as well as in the USI message of allocated MP#5.

In the embodiment of the present invention, the MCCH information transmitted during every modified period only transmits information of services included in the MSI and USI messages in the corresponding modification period. For instance, the messages transmitted on the MCCH (e.g., MBMS point-to-multipoint RB information, MBMS general information, MBMS access information—also referred to as MCCH information) includes only the MCCH information associated with Services 8, 11, 12, 13, and 14 transmitted via the MSI and USI messages in MP#6. As another embodiment of the present invention, the information transmitted on the MCCH during each modification period can include MCCH information of all the services in the UP to which the UE belongs.

Table 3 illustrates an example of how specific service information is transmitted when the session of the specific service is initiated or terminated.

TABLE 3

| | USI Period | | | | | |
|---|---|---|---|---|---|---|
| | UP#1 | | | | UP#2 | |
| | | | Modification Period | | | |
| | MP#1 | MP#2 | MP#3 | MP#4 | MP#5 | MP#6 |
| Session Start | | Service 15<br>Service 17 | | Service 16 | | |
| Session Stop | | Service 3 | Service 11 | Service 10 | | |

TABLE 3-continued

| | USI Period | | | | | |
|---|---|---|---|---|---|---|
| | UP#1 | | | | UP#2 | |
| | | | Modification Period | | | |
| | MP#1 | MP#2 | MP#3 | MP#4 | MP#5 | MP#6 |
| MSI | Service 2<br>Service 8 | Service 2<br>Service 3<br>Service 5<br>Service 15<br>Service 17 | Service 11<br>Service 14<br>Service 17 | Service 10<br>Service 12<br>Service 16 | | Service 8<br>Service 12 |
| USI | Service 1<br>Service 3<br>Service 4<br>Service 5 | Service 6<br>Service 7<br>Service 8<br>Service 9<br>Service 10 | Service 12<br>Service 13 | Service 1<br>Service 2<br>Service 3<br>Service 4<br>Service 15 | Service 6<br>Service 7<br>Service 8<br>Service 9<br>Service 17 | Service 14<br>Service 16 |

When a session of a particular service is activated, the UTRAN allocates the particular service to a group. Thereafter, the UTRAN includes the service identity of the particular service in the MSI message of a specific MP. In addition, the UTRAN also includes the service identity of the particular service in the USI message of a MP to which the particular service is allocated. If the MP of the MSI message is identical to the MP of the USI message, the service identity of the particular service is only included in the MSI message of the MP.

As illustrated in Table 3, if start of Service 15 session takes place in MP#2, the UTRAN includes Service 15 information in the MSI message of MP#2, and the service identity of Service 15 is included in the USI message of a first group to which Service 15 information is allocated within one UP. Since the session of Service 15 starts in MP#2, Service 15 information is not included in MP#1 but included in the USI message starting from MP#4.

With respect to the session of Service 17 starting from MP#2, Service 17 information is included in the MSI message of MP#2. Furthermore, since the UTRAN has allocated Service 17 information to a second group (i.e., MP#2, MP#5) of the UP, Service 17 information is included in the MSI message of MP#5.

As for the session of Service 16 starting in MP#4, Service 16 information is included in the MSI message of MP#4. Furthermore, since the UTRAN has allocated Service 16 information to a third group (i.e., MP#3, MP#6) of the UP, Service 16 information is included in the MSI message of MP#6.

However, if termination of the session of Service 3 is indicated in MP#2, the UTRAN includes Service 3 in the MSI message of MP#2, and removes Service 3 information from the first group (i.e., MP#1) to which Service 3 is originally allocated. After the removal, Service 3 information is no longer transmitted in subsequent corresponding MPs. However, since Service 3 is allocated to the first group (i.e., MP#1), identity information of Service 3 is included in the USI message of MP#1.

Additionally, if termination of the session of Service 11 is indicated in MP#3, the UTRAN includes Service 11 information in the MSI message of MP#3, and removes Service 11 information from the third group to which Service 1 is originally allocated. After the removal, Service 11 information is no longer transmitted in subsequent MPs. For example, as shown in Table 3, after the session termination of Service 11 in MP#3, subsequent corresponding MPs, namely, MP#6 does not include Service 11. However, since Service 3 is pre-allocated to the first group, identity information of Service 3 is included in the USI message of MP#1.

Furthermore, if termination of the session of Service 10 is indicated in MP#4, the UTRAN includes Service 10 information in the MSI message of MP#4, and removes Service 10 information from the second group to which Service 10 is originally allocated. After the removal, Service 10 information is no longer transmitted in subsequent corresponding MPs.

When a group of identify information is used in the MSI message, information about all services belonging to the group may be included in the USI message, because all available MBMS service identities may be broadcasted during a modification period to support UEs that come from other cells. Thus, if UEs come from other cells, the UEs may interpret the transmission group identity after receiving the USI as well as the MSI messages.

Figure 5:
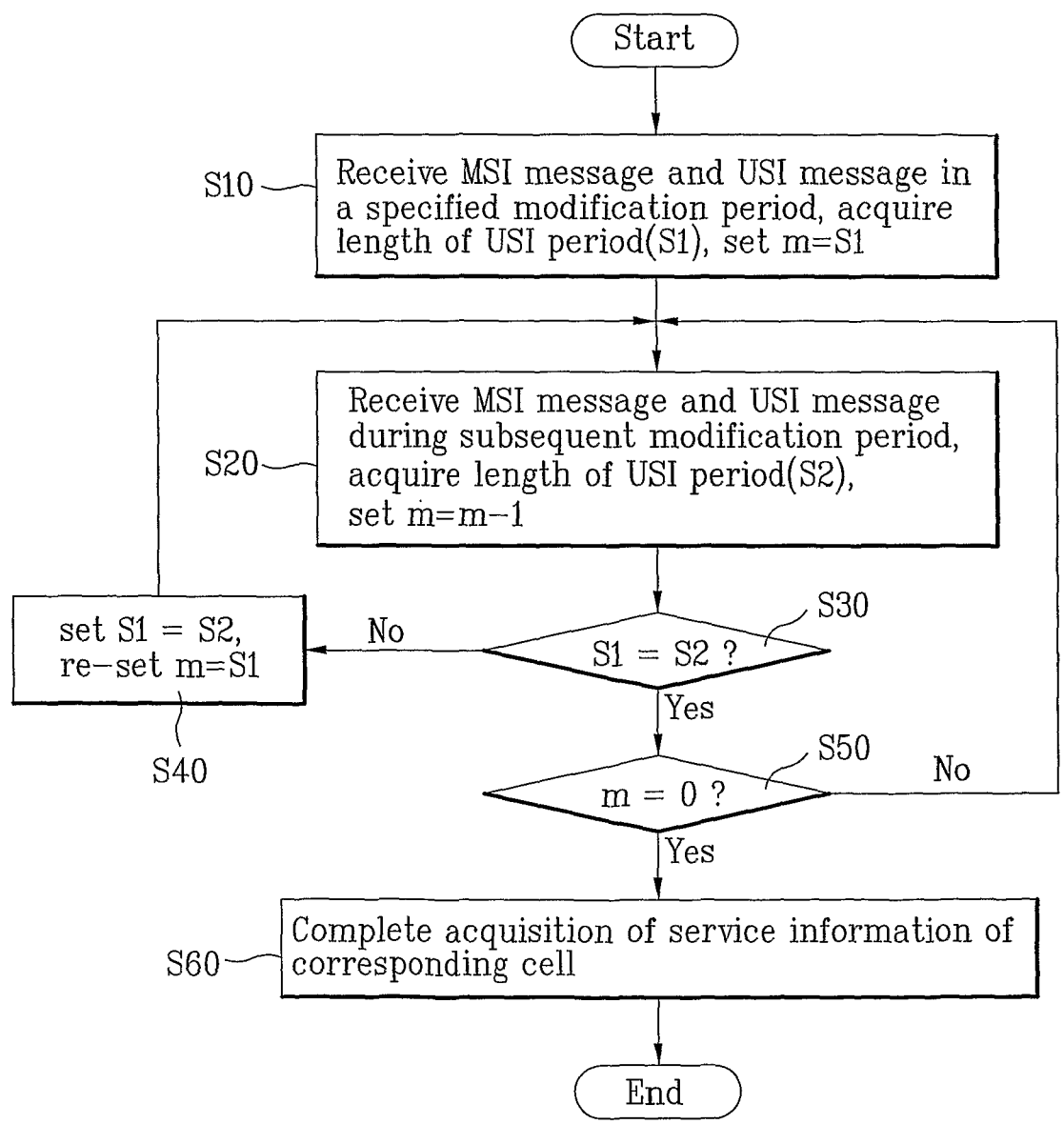
FIG. 5 illustrates a process of acquiring service information by the UE according to the present invention.

FIG. 5 illustrates a process of acquiring service information by the UE according to the present invention. In the embodiment of the present invention, the UE has to receive the MSI message and the USI message for the entire duration of the UP in order to fully acquire service information of a specified cell. The UE receives the messages during the entire UP to acquire all service information of the cell when the UE moves to a different cell, first activates the MBMS service, or error occurs in managing the service information. After all the service information is received, the UE can receive the MSI message only to determine the status of service information. Here, absent movement or mobility of the UE, there is no need to perform the above operations/processes.

With respect to the service information acquisition process of the UE, the UTRAN transmits a length of the UP on a Broadcast Control Channel (BCCH) or on the MCCH to the UE. If the length of the UP is transmitted on the MCCH, the UTRAN can use any one of the MSI message and the USI message, which are transmitted periodically, to transmit the length of the UP. Preferably, the length of the UP should be included in the USI message, and if the length of the UP is modified/changed, the modified length of the UP should be included in the MSI message.

A detailed description of FIG. 5 is as follows. In order to fully acquire service information of a specific cell, the UE receives information via the MCCH and receives the MSI message and the USI message during specified modification period(s). Then, the UE stores the contents of the MSI and the USI messages (e.g., service information). Using the MSI and USI messages, the length of the UP can be acquired. Here, the length of the UP can be expressed as $S1$, and a value of $S1$ corresponds to multiple(s) of the modification period. The UE stores the value of S1, and m is set to S1 (m=S1) (S10).

Subsequently, the UE receives the MSI message and the USI message during the subsequent modification period and stores the contents of the MSI and USI messages. Using the MSI message or the USI message, the UE acquires the length of the UP. Here, the UP can be expresses as S2 and a value of S2 corresponds to multiple(s) of the modification period. At this time, m is set to m−1 (m=m−1) (S20).

After S20, the UE determines whether the value of S2 is identical to the value of S1 (S30). If the value of S2 is different than that of S1, the UE sets a different S1 value by replacing the value of S1 with the value of S2. The replaced value of S1 is stored and m is reset to S1. The UE then deletes or removes all of the previously stored MSI and USI messages except for the most recently stored MSI and USI messages (i.e., MSI and USI messages of the current MP). Thereafter, the UE re-executes the operation of S20.

Alternatively, if the value of S2 is identical to the value of S1, then the UE further determines whether the value of m is '0.' If the value of m does not equal '0,' then the UE re-executes the operation of S20 (S50). If, however, the value of m equals '0,' then it signifies that the stored MSI and USI messages include all the service information of the corresponding cell, and that there is no more service information that needs to be received in connection with the corresponding cell (S60).

Figure 6:
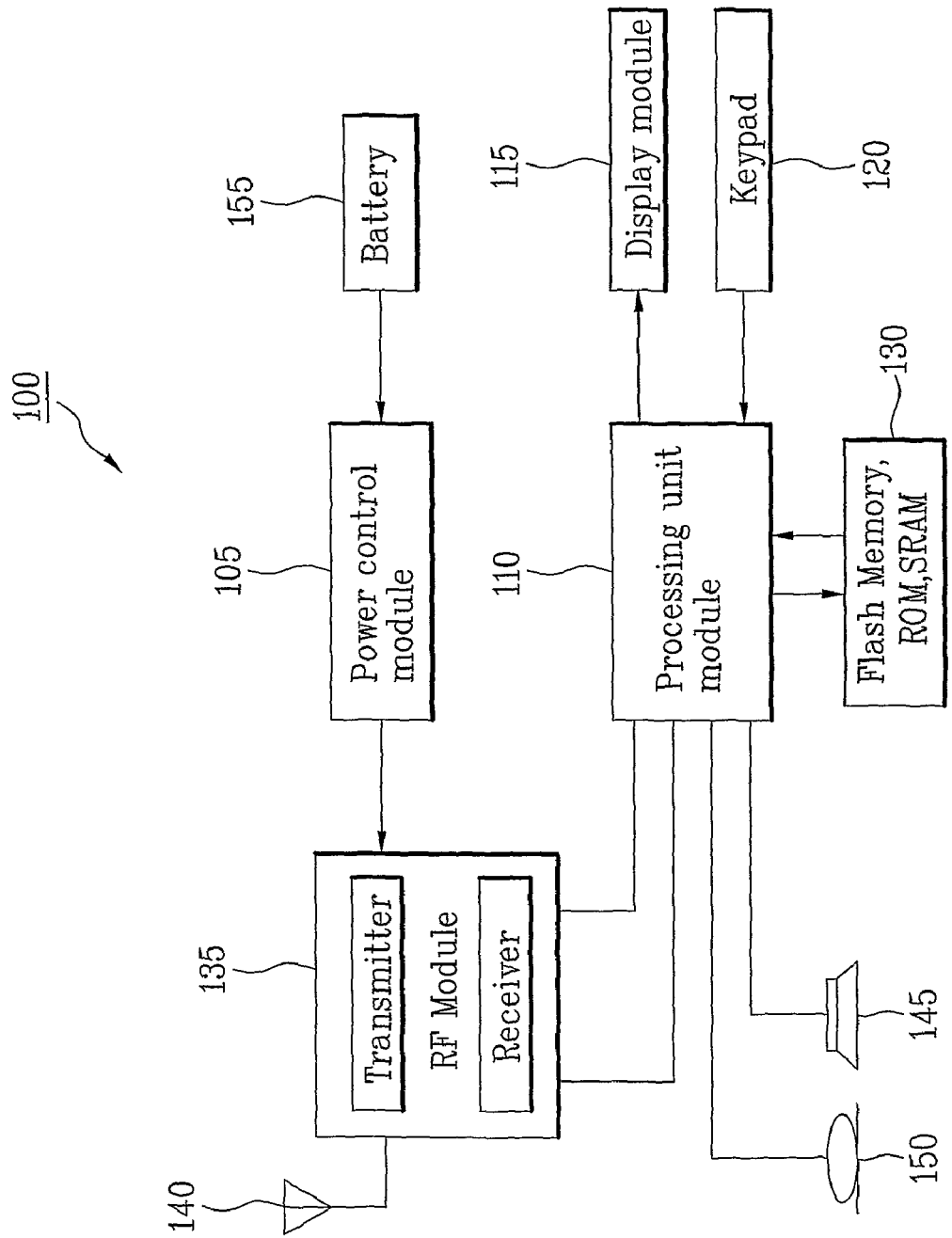
FIG. 6 is a structural diagram of a wireless communication device that performs the operation of the present invention.

FIG. 6 is a structural diagram of a wireless communication device that performs the operation of the present invention. The wireless communication device 100 comprises a processing unit module 110 and a Radio Frequency (RF) module 135, similar to a micro processor or a digital processor, a power control module 106, an antenna 140, a battery 155, a display module 115, a keypad 120, a storage module 130 (e.g., Read Only Memory (ROM), Static Random Access Memory (SRAM), and flash memory), a speaker 145, and a microphone 150.

The keypad 120 can be used to enter a command by pressing button(s), and the microphone 145 can be used to activate voice recognition. The processing unit module 110 can receive and process the entered command in order to perform functions demanded by the user. In order to perform the user demanded functions, necessary data can be searched and found from the storage module 130. Moreover, the processing unit module 110 can display the information related to the user command and the data searched from the storage module 130 for the user's convenience on the display module 115.

The processing unit module 110 can instruct the RF module 135 to transmit radio or wireless signal including the voice communication data. The RF module 135 comprises a transmitter and a receiver for communicating the radio signals. Here, the radio signals are ultimately transmitted and received via the antenna 140. If the RF module 135 is able to receive the radio signals, the radio signals are converted into baseband frequency so that the processing unit module 110 can process the radio signals. The converted signals can be transmitted via the speaker 145 or can be transmitted in a form that can be decoded. The RF module 135 can receive data from the network or can be used to transmit information measured or arising at the radio communication device to the network. The storage module 130 can be used to store the information measured or taking place at the radio communication system. Furthermore, the processing unit module 110 can be used to receive the data from the radio communication system, to process the received data, and to transmit the processed data.

The wireless network and the wireless communication device 100, which receives point-to-multipoint multimedia or multicast service, can receive a plurality of service group control information formed by control information of services grouped into service groups via the RF module 135. Furthermore, the plurality of service group control information periodically received from the processing unit module 110 can be used to acquire control information of service(s) which the radio communication device 100 is receiving. In addition, the control information grouped into service groups can be repeatedly received via the processing unit module 110 which controls the RF module 135.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of receiving control information from a network by a mobile terminal in a wireless communication system, the method comprising:
   receiving information of a specified number of groups, wherein a plurality of point-to-multipoint services are divided into the specified number of groups;
   receiving the specified number of Multimedia Broadcast/Multicast Service Control Channel (MCCH) messages per a first period during a second period, wherein the MCCH messages comprise modified information (MSI) and a part of unmodified information (USI), wherein the second period is the specified number times of the first period; and
   acquiring the control information from the specified number of MCCH messages,
   wherein the unmodified information is divided into the specified number of parts,
   wherein each of the specified number of parts of the unmodified information corresponds to each of the specified number of groups and is included in a MCCH message sequentially per the first period, and
   wherein the control information is related to the plurality of point-to-multipoint services.

2. The method of claim 1, wherein each MCCH message is received through a control channel.

3. The method of claim 2, wherein the control channel is a Multimedia Broadcast/Multicast Service Control Channel (MCCH).

4. The method of claim 1, wherein at least the modified information or unmodified information is updated during each first period.

5. A method of transmitting control information to a mobile terminal from a network in a wireless communication system, the method comprising:
   grouping a plurality of point-to-multipoint services into a specified number of groups;
   transmitting information of the specified number of groups; and
   transmitting the specified number of Multimedia Broadcast/Multicast Service Control Channel (MCCH) messages per a first period during a second period, wherein the MCCH messages comprise modified information (MSI) and a part of unmodified information (USI), wherein the second period is the specified number times of the first period,
   wherein the control information is acquired from the specified number of MCCH messages, wherein the unmodified information is divided into the specified number of parts, wherein each of the specified number of parts of the unmodified information corresponds to each of the specified number of groups and is included in a MCCH message sequentially per the first period, and wherein the control information is related to the plurality of point-to-multipoint services.

6. The method of claim 5, wherein each MCCH message is received through a control channel.

7. The method of claim 6, wherein the control channel is a Multimedia Broadcast/Multicast Service Control Channel (MCCH).

8. The method of claim 5, wherein at least the modified information or unmodified information is updated during each first period.

9. The method of claim 1, wherein the modified information includes information on modified point-to-multipoint services regardless of which group the modified point-to-multipoint services are included, and wherein the part of the unmodified information included in the MCCH message received at a specific first period includes information on unmodified point-to-multipoint services included in a specific group corresponding to the specific first period.

10. The method of claim 5, wherein the modified information includes information on modified point-to-multipoint services regardless of which group the modified point-to-multipoint services are included, and wherein the part of the unmodified information included in the MCCH message transmitted at a specific first period includes information on unmodified point-to-multipoint services included in a specific group corresponding to the specific first period.

* * * * *